United States Patent [19]

Leeper

[11] Patent Number: 4,488,478
[45] Date of Patent: Dec. 18, 1984

[54] CONTINUOUS FRYER FOR POTATO CHIPS AND OTHER SNACK FOODS

[75] Inventor: Alan L. Leeper, Manchester, N.H.

[73] Assignee: J. C. Pitman Company, Inc., Concord, N.H.

[21] Appl. No.: 511,985

[22] Filed: Jul. 8, 1983

[51] Int. Cl.$^3$ ............................................. A47J 37/12
[52] U.S. Cl. ...................................... 99/330; 99/353; 99/404; 99/407; 99/408
[58] Field of Search ................. 99/353, 330, 403, 404, 99/407, 408, 405, 443 C

[56] References Cited

U.S. PATENT DOCUMENTS

| | | | |
|---|---|---|---|
| 1,760,979 | 6/1930 | Ferry | 99/405 |
| 2,546,163 | 3/1951 | McBeth | 99/404 |
| 2,833,204 | 5/1958 | Kipnis | 99/405 |
| 3,329,081 | 7/1967 | Roth | 99/405 |
| 3,472,155 | 10/1969 | Caridis | 99/404 |
| 3,761,290 | 9/1973 | Brunner | 99/330 |
| 3,788,302 | 1/1974 | Malaney | 99/330 X |
| 4,366,749 | 1/1983 | Caridis | 99/404 X |

*Primary Examiner*—Billy J. Wilhite
*Attorney, Agent, or Firm*—LeBlanc, Nolan, Shur & Nies

[57] ABSTRACT

A frying unit for continuously frying potato chips and other snack foods such as corn chips and sweet potato chips is disclosed. The unit is compact, may be easily cleaned and serviced, and automatically controlled at an external control station. The unit consists of an elongated frying kettle covered by a hood and having, optionally, a slicer at an entrance end. A product delivery conveyor is disposed at an exit end. Twin paddle wheels are provided within the kettle for breaking up the sliced product as it enters an oil bath therein. Downstream of the paddle wheels a submersion conveyor is provided having depending flytes mutually spaced therealong for conveying the product through the oil bath to the delivery conveyor at the exit end. The entire product conveyor system, paddle wheels and conveyors may be pivoted upwardly as a unit, out of the kettle, by a linear actuator mounted on the external side thereof. A flexible drive coupling is provided to facilitate this pivotal movement. Oil within the kettle may be recirculated through a heat exchanger. Separately, oil within the kettle may be recirculated through a filter, and an oil level within the kettle is maintained automatically by an internal sensor which controls a filling means.

8 Claims, 9 Drawing Figures

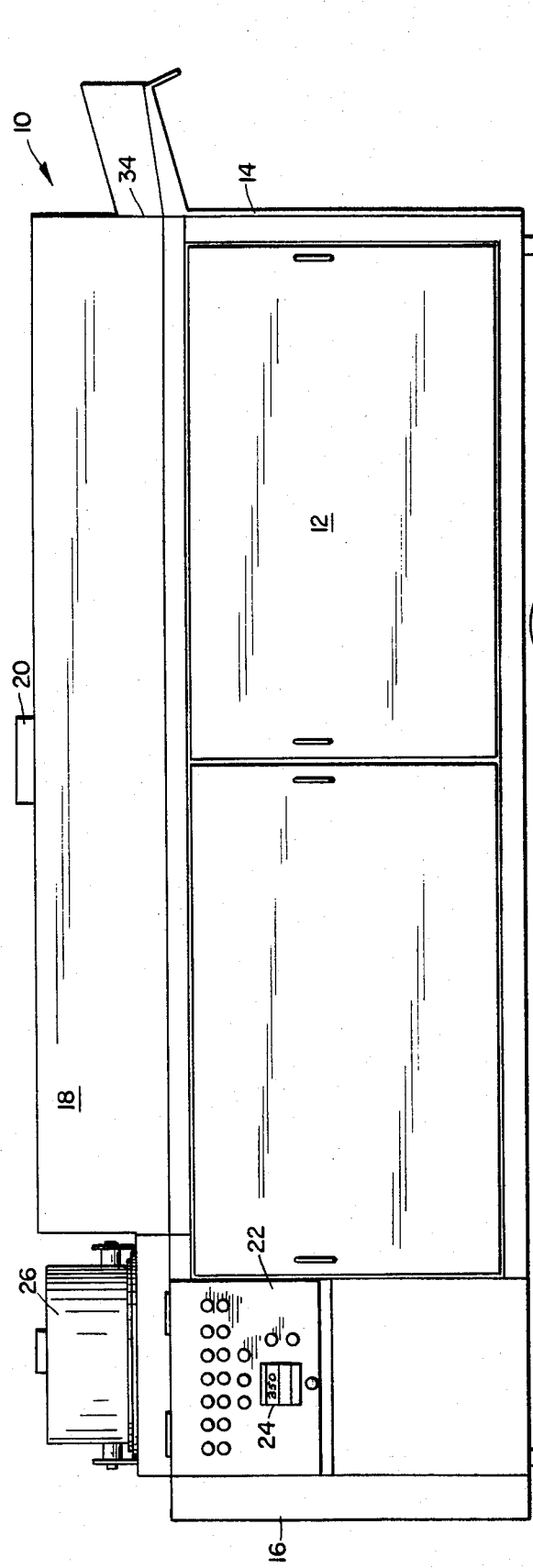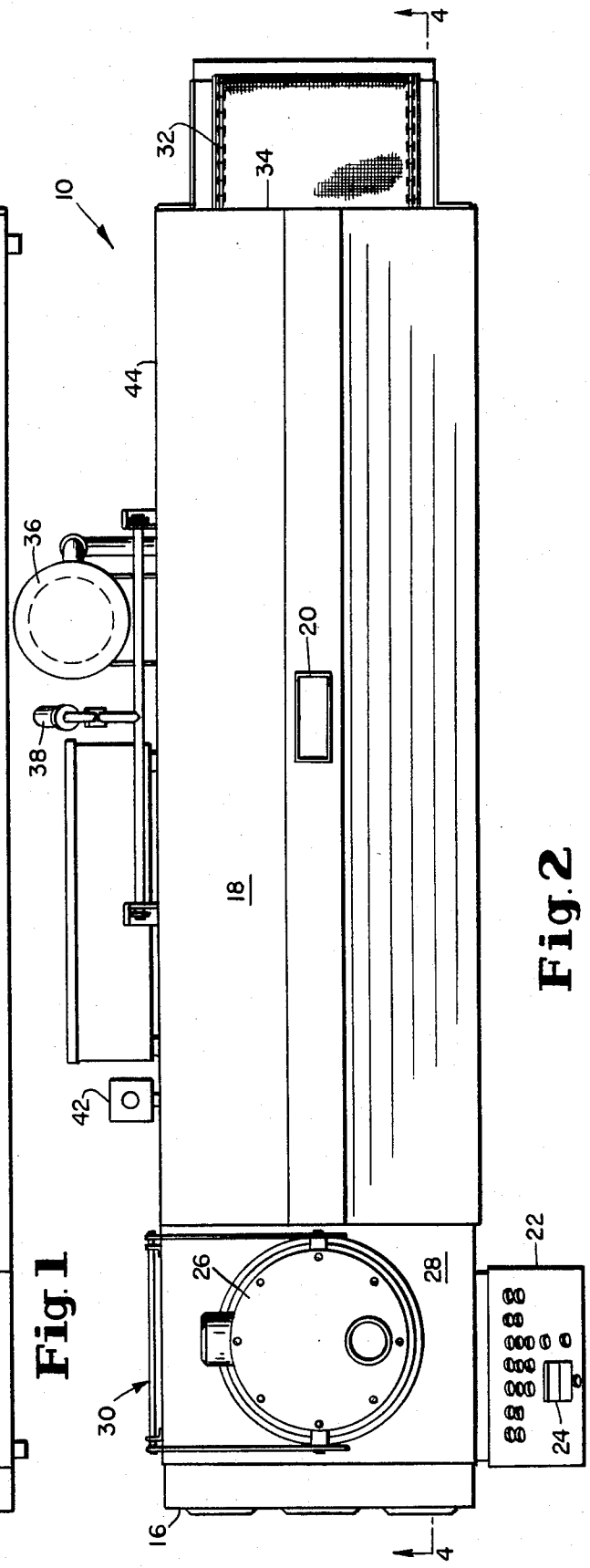

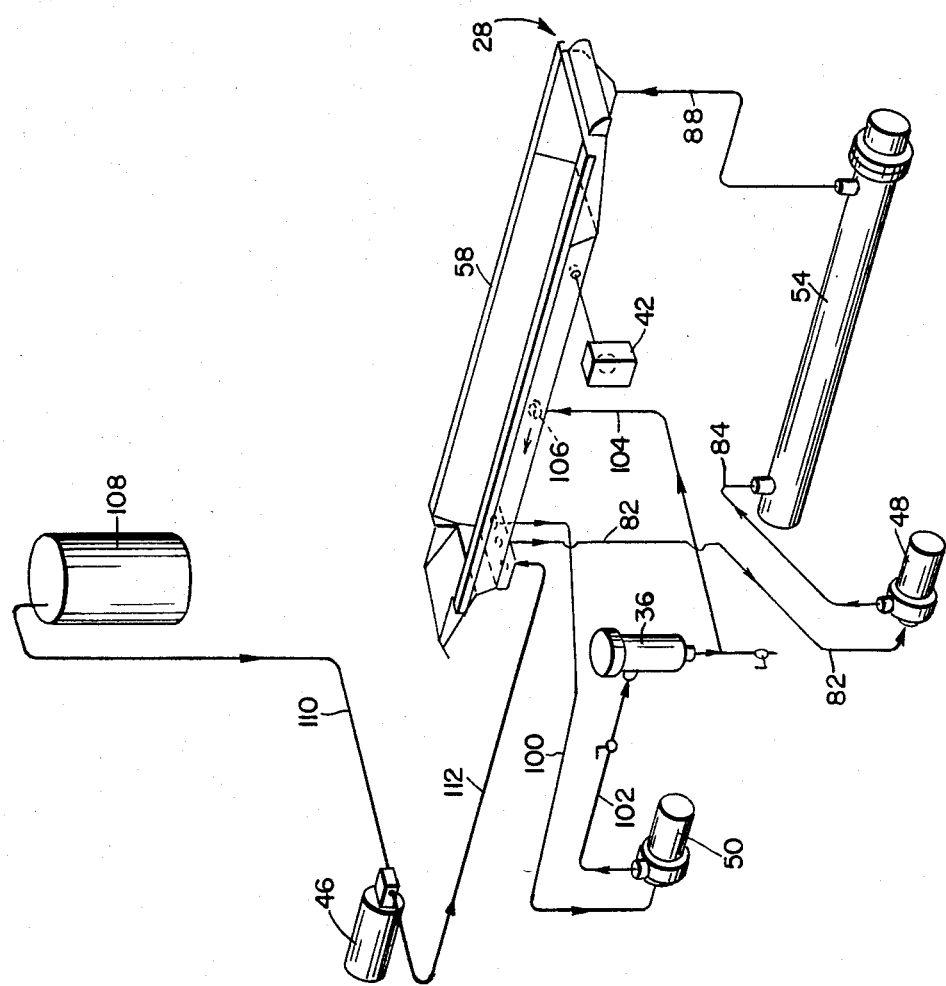
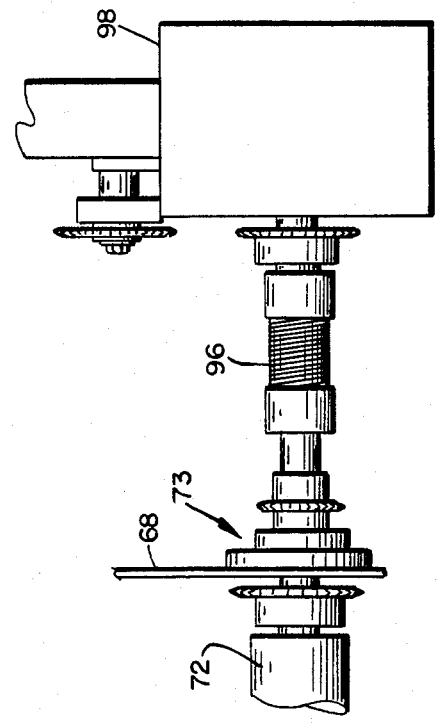

CONTINUOUS FRYER FOR POTATO CHIPS AND OTHER SNACK FOODS

This invention relates to a small, compact commercial fryer for use by, for example, an independent potato chip producer or even a small store, shop, or restaurant. The typical industrial type fryer, while capable of continuous operation, is both too costly and too large for small independent users. Accordingly, a need exists for a highly efficient, compact unit capable of continuous operation and capable of producing limited quantities of product for commercial sales as needed.

A fryer for producing limited quantities for commercial sales must be compact in size because of space requirements normally encountered. In addition, the device must be versatile and able to cook at different temperatures. Furthermore, the device should be capable of operating in a kitchen or shop type environment whereby steam, oil fumes, and the like are not released. Furthermore, the oil bath must be continuously filtered and recirculated to achieve continuous operation. Finally, it is highly desirable that the unit itself be easily maintained and cleaned.

The problems associated with producing a compact frying unit for potato chips and the like which is suitable for small independent producers, shops, and restaurants, has been solved by the present invention, as will be described.

The device of the present invention consists of a continuous conveyor cooker utilizing an oil bath which is continuously recirculated and reheated and separately continuously filtered. In addition, the device of this invention features a conveyor assembly which may be pivoted out of the cooker kettle for rapid cleaning.

The device of this invention then consists of a kettle member for holding an oil bath. The kettle is elongated having an entrance end and an exit end and a hood member mounted thereover. The hood is intended to be exhausted through a conventional exhaust port and fan required in kitchens and the like of commercial establishments.

A self-contained conveyor assembly normally rests within the kettle member. The conveyor assembly includes inlet paddle wheels, a mesh, continuous submersion conveyor having lateral flytes thereon and an exit delivery mesh, continuous conveyor. The assembly rests in the kettle member with the lower run of said submersion conveyor disposed slightly beneath the surface of the cooking oil. The flytes thereon depend into the cooking oil and are designed to convey the product in the oil from the entrance to the exit. A drive wheel is provided within the submersion conveyor which wheel is coupled to a drive means by a flexible coupling, and also coupled to the paddle wheels and a similar drive wheel for the delivery conveyor. The conveyor assembly also mounts an external shaft which, when driven by a linear actuator, causes the assembly to pivot upwardly, as a unit, preferably 45 degrees, whereby the assembly may be rapidly cleaned. The linear actuator may be externally controlled so that the operator merely by engaging the actuator will raise the assembly out of the kettle for cleaning. When cleaning is completed the process is reversed to return the assembly to its operational position within the kettle with the belt disposed above the oil bath.

Upstream of the conveyor assembly is provided an optional slicer mechanism at the entrance to the kettle. Potatoes and the like may be fed into the slicer which may be of conventional design and chip slices then fall through the entrance and into the kettle. Optionally the slicer may be removed and product fed directly through the entrance port. Between the entrance port and the submersion conveyor are provided twin paddle wheels which are designed to break up the particulate chips or the like as they enter the bath and convey them forwardly until they encounter the submersion conveyor flytes. The flytes then confine the product in the oil bath as it is conveyed along the kettle the length of the conveyor assembly. As the cooked chips reach the end of the conveyor assembly, a delivery conveyor at the exit port is provided to pick up the chips and deposit them into a hopper or the like external to the device of this invention.

The oil bath may be continuously recycled through a heat exchanger which preferably is an electric immersion heater. The recirculated oil then is maintained at a desired temperature. Separately, the oil within the oil bath is continuously circulated through a filtering mechanism of conventional design. Accordingly, oil in the oil bath may be continuously filtered and continuously reheated for extended operations. Optionally, the oil, depending upon the product, may be cyclically reheated and cyclically filtered as needed.

Typically the replacement oil is provided from an external reservoir which is coupled to the bath itself. The level of oil in the bath is continuously monitored by a sensor which activates a pumping means to add oil as needed to maintain a constant level bath.

The device of this invention then is versatile, efficient, and may be easily cleaned. The device of this invention then is highly suitable for small independent potato chip producers, or for commercial applications in shops and restaurants to produce snack foods such as potato chips, corn chips, sweet potato chips, and the like.

Accordingly, it is an object of this invention to provide a frying device for potato chips and other snack foods which will continuously cook said foods or cook limited quantities thereof, and which may be easily cleaned and operated.

It is yet another object of this invention to provide a fryer for potato chips and the like for use by small independent producers, restaurants, commercial establishments, and the like which will provide on either a continuous basis, or a limited quantity basis, a cooked product.

It is another object of this invention to provide a conveyor fryer for continuous operation which contains a separately mounted conveyor assembly within an oil bath wherein the conveyor assembly may be quickly pivoted upwardly out of the bath for cleaning and returned for operation.

It is still another object of this invention to provide a continuous cooker for potato chips and the like which combines an easily maintained conveyor assembly and both a continuously recirculating and reheated oil bath and continuously recirculated and filtered oil bath for continuous operation.

These and other objects of this invention will become readily apparent with reference to the drawings and following description wherein:

FIG. 1 is a front view of the fryer device of this invention.

FIG. 2 is a plan view of the device of this invention.

FIG. 8 is a fragmentary top view of the drive coupling.

FIG. 9 is a schematic piping chart for the oil circulation systems of the device of this invention.

Figure 3:
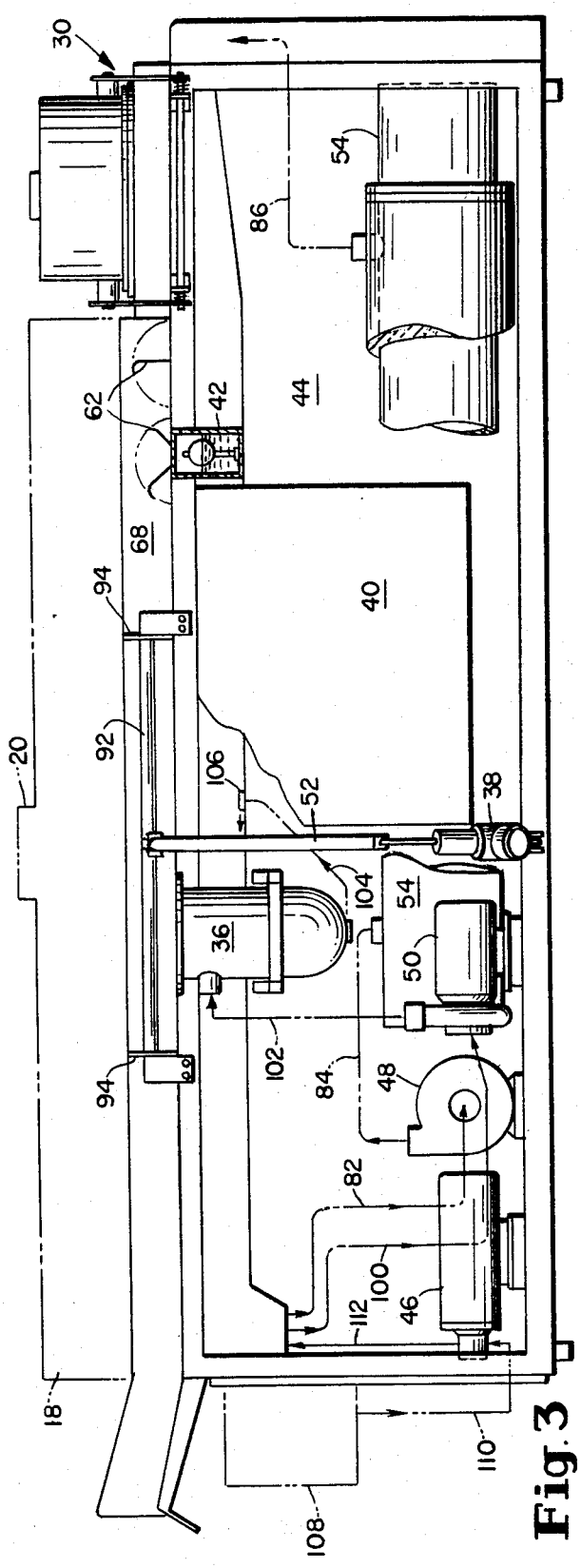
FIG. 3 is a rear view of the device of this invention with conduits removed and a portion of the rear panel removed, and showing the slicer and hood in phantom.

With attention to the drawings and to FIGS. 1 and 2, in particular, the device of this invention 10 consists of a housing having removable front panels 12, a right end panel 14, and a left end panel 16. The device also includes a removable hood member 18 with a vent 20 intended to be coupled to a conventional exhaust fan for removing steam and oil fumes from the interior thereof. The hood may be removably secured to the device of this invention by any conventional means, or may be hingedly mounted as will be subsequently explained.

A control console 22 is typically provided having controls for the electrical components of the device of this invention and a temperature read-out 24 is preferably provided for visual display of the oil temperature within the device.

Figure 6:
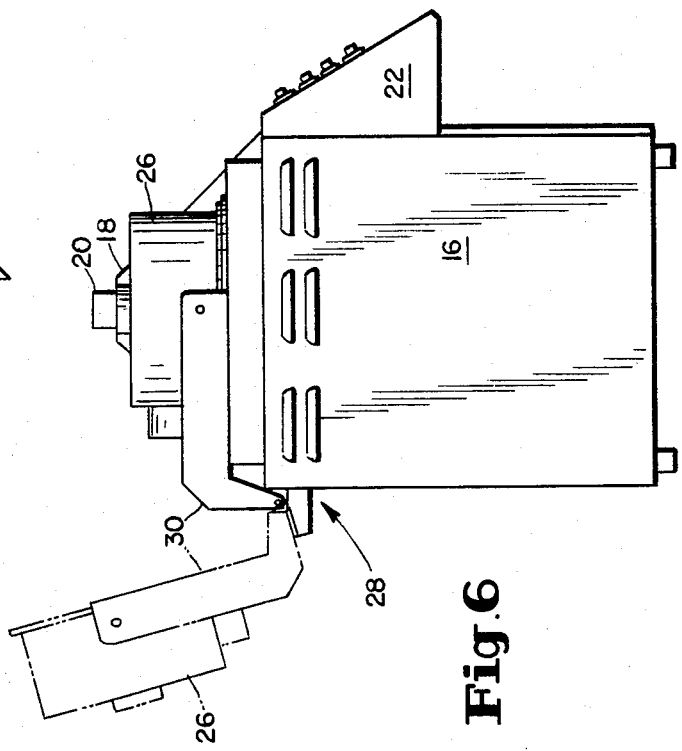
FIG. 6 is a left end view of the device of this invention showing the slicer displaced in phantom.

A slicer 26 is also provided for slicing potatoes if it is desired to prepare potato chips. The slicer 26 is mounted over an entrance portion 28, preferably by a hinged bracket 30, so that the slicer may be pivoted away from the entrance as shown in FIG. 6 to expose an entrance port (not shown).

A delivery conveyor 32 is provided at an exit port 34 for delivering cooked food from the device of this invention to a hopper or the like (not shown).

With attention to FIGS. 2 and 3, mounted externally at the rear of the device 10 are the following components: an oil filter 36, a linear actuator 38, an enclosure for the electrical components 40, and an oil level sensor 42.

With attention to FIG. 3 wherein a portion of the rear panel 44 has been removed, the device of this invention includes the following components: an oil supply pump 46, an insulated heat exchanger pump 48, a filter pump 50, a linear actuator connecting rod assembly 52, and a heat exchanger 54. The heat exchanger preferably is electrical of the immersion type, and of conventional design. The heat exchanger is utilized to re-heat oil from the oil bath as will be subsequently explained. Each of the above-identified mechanical components are preferably electrically activated and controls therefor are preferably placed on the control console 22.

Figure 4:
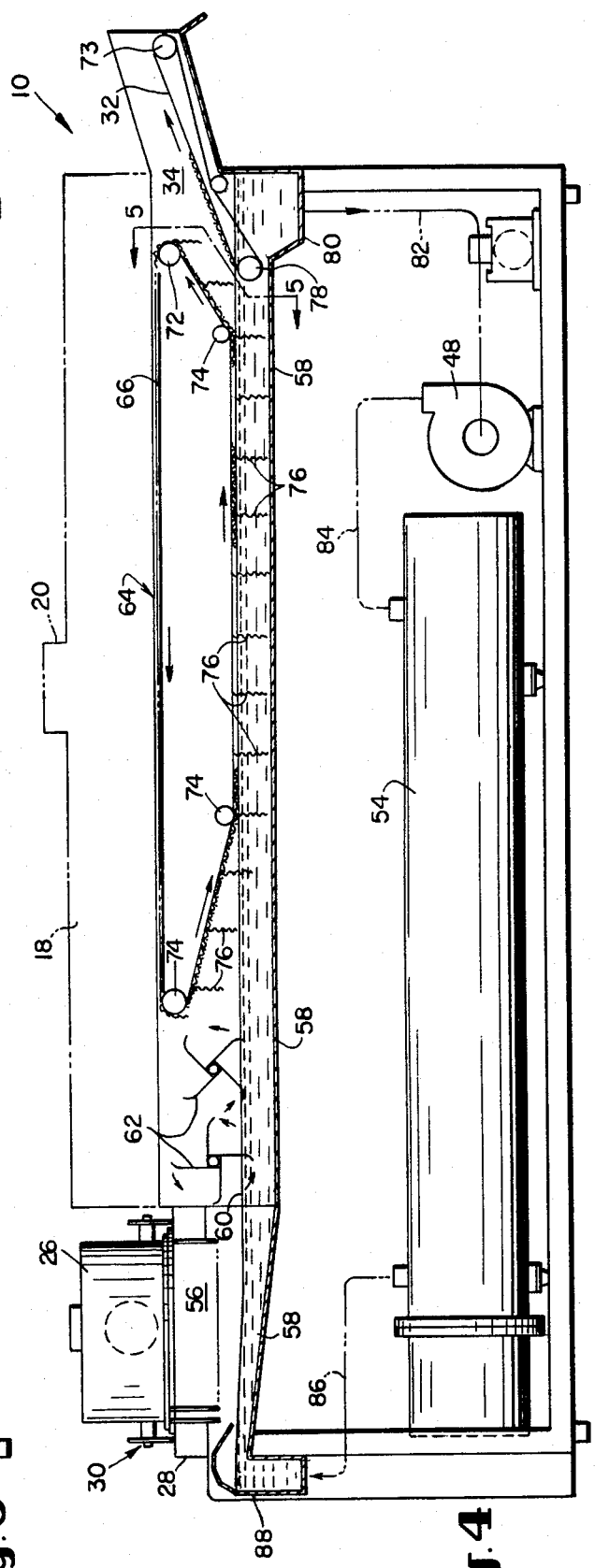
FIG. 4 is a cross-sectional view taken along lines 4—4 of FIG. 2 and showing the hood in phantom.
Figure 5:
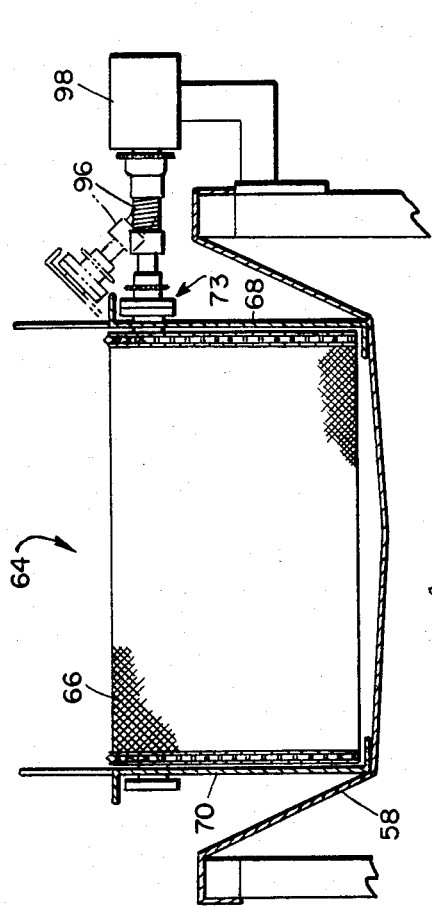
FIG. 5 is a fragmentary cross-sectional view taken along lines 5—5 of FIG. 4.

With attention to FIGS. 4 and 5, the device 10 includes an entrance port 56 surrounded by a Teflon coated deflector ring at the entrance end 28 which is normally covered by the slicer 26. If it is desired to feed the product to be cooked through the entrance end without using the slicer, it may be rotated about the pivotal mounting bracket 30 to expose the open port 56. The interior of device 10 includes a kettle member 58 which extends from the entrance end 28 to the exit port 34. Kettle 58 is normally adapted to contain an oil bath 60 shown in fragment in FIG. 4. Downstream of the entrance port 56 are disposed two rotatable paddles 62 which are preferably Teflon coated. Paddles 62 are intended to encounter the product entering through port 56 in bath 60 and both break the product up and disperse it for even cooking, and advance the product downstream. Downstream of paddles 62 is disposed the submersion conveyor 64. As shown in FIG. 5 conveyor 64 preferably consists of an endless metal mesh belt 66 rotatably mounted between two sidewalls 68 and 70. Sidewalls 68 and 70 are intended to rest upon the kettle 58 shown in phantom in FIG. 5.

Belt 66 is preferably driven by a drive roller 72 and is maintained in a desired configuration by a plurality of followers 74. Belt 66 mounts a plurality of mutually spaced flytes 76 which depend therefrom, but preferably are not free standing. In the preferred embodiment of this invention, flytes 76 are also of metal mesh. The lower portion of belt 66 is intended to be disposed at the surface of the oil bath 60. Flytes 76 then encounter the product and contain it as belt 66 draws the product along the kettle 58 toward the delivery conveyor 32. When the product encounters the delivery conveyor 32 which has only a lower portion thereof 78 submerged, the delivery conveyor 32 picks up the product and conveys it through exit port 34. The delivery conveyor 32 is preferably also of mesh and provides a slowly moving surface upon which the product dries.

Conventional drive means (not shown) for paddles 62, and belt 66, and delivery conveyor 32 are not shown. The drive means is preferably coupled to roller 73 which in turn is coupled to paddles 62 and roller 72 of conveyor 64. However, it is preferred that a predetermined ratio be maintained between the drive means for conveyor 66 and paddles 62 and conveyor 32 so that they rotate at predetermined rates to thereby control the cooking time or the time with which the product is contained within the oil bath 60.

As previously noted a heat exchanger 54 is utilized in the device of this invention. A tank well 80 is provided at the exit port of the device 10, and a conduit shown schematically at 82 extends between the heat exchanger pump 48 and tank well 80. Conduits 84 and 86 then interconnect, respectively, the pump 48 and heat exchanger 54, and the heat exchanger 54 and the bath 60. Conduit 86 preferably extends through a flow box 88 and admits the heated oil from the heat exchanger 54 at the entrance end 28 of the device of this invention 10.

Figure 7:
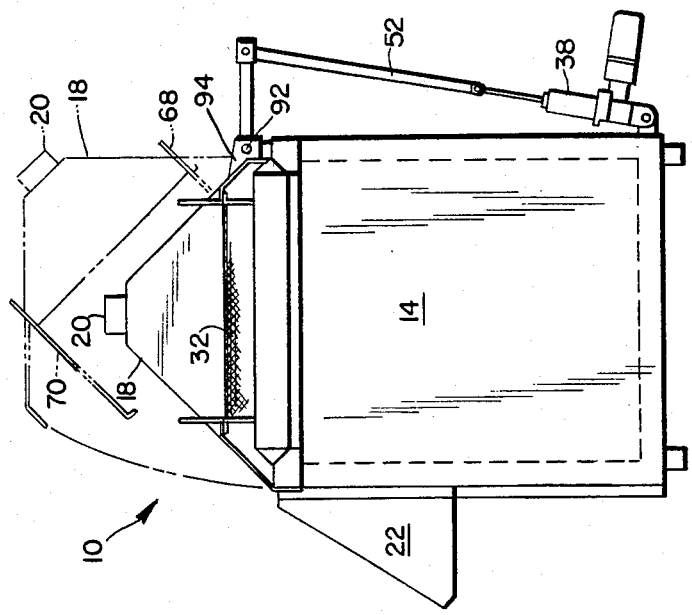
FIG. 7 is a right end view of the device in this invention showing the conveyor assembly rotated upwardly for cleaning in phantom and the removable hood and control console also in phantom.

With reference to FIGS. 3, 7 and 8, the submersion conveyor 64 is normally disposed within the kettle as shown in FIGS. 4 and 5. However, for cleaning purposes the entire assembly, including paddles 62, conveyor 64 and conveyor 32, may be pivoted out of the kettle as shown in phantom in FIG. 7. The linear actuator 38 is coupled through a connecting arm 52 to a shaft 92 which in turn is rigidly mounted by gussets 94 to a sidewall 68. Downward movement of the actuator connecting rod 52 then raises the assembly by causing sidewall 68 to rotate, preferably a 45 degree angle about shaft 92. The paddles 62, conveyor 64 and conveyor 32 mounted between sidewalls 68 and 70 may then be cleaned and the process reversed to return the assembly to the cooking position shown in FIG. 4.

As previously indicated, the drive means (not shown) drives a drive roll 73 which in turn drives conveyor 32, and paddles 62 and conveyor 64. As shown in FIG. 8, a flexible coupling 96 is provided which through appropriate conventional bearings and pillow blocks shown in general at 98 couple the drive roll 73 to a drive means (not shown). Flexible coupling 96 is conventional and a preferred embodiment is a Uniflex Flexible Coupling by Lovejoy of Downers Grove, Ill. A suitable model is the "Lovejoy" U-75.

With reference to FIG. 9, the oil system of this invention consists of three circuits. As previously described, the heat exchanger 54 and its pump 48 are connected through conduits 82, 84, and 88 with the interior of the kettle whereby oil from the discharge end is withdrawn, circulated through the heat exchanger to be re-heated and re-admitted at the entrance end. Similarly, a filter circuit is provided utilizing filter 36 which is controlled by pump 50. In the filter circuit oil is withdrawn from the exit end of the kettle through conduit 100 and pumped by pump 50 through conduit 102 to filter 36. After passing through filter 36 it is further pumped through conduit 104 and returned to the kettle at a mid-point thereof. A baffle plate 106 is provided at the entrance port for conduit 104 so that the oil being admitted will not disturb the product passing through the oil bath.

In addition, there is also provided a third circuit for the addition of oil to the oil bath in kettle 58. A remote reservoir 108 is provided which is interconnected by conduit 110 with pump 46, which in turn supplies oil through conduit 112 to the exit end of the kettle 58. Pump 46 is actuated as previously described by a conventional oil level sensor 42, also mounted on kettle 58.

Accordingly, the replacement oil is added at the discharge end so that it may be immediately recirculated through the heat exchanger and heated to the operating temperature of the cooker.

As noted above, the preferred heat exchanger is an electric immersion type heater contained within a shell which can range from 30 kw to 150 kw, depending upon the actual product being fried.

In summary, a fryer for potato chips or other particulate foods and snack foods has been disclosed. The fryer is compact and entirely suitable for restaurants, shops, commercial operations, and independent potato chip producers who desire to have a compact and relatively inexpensive means for either continuously cooking, or cooking limited quantities, of such foods.

The foods are admitted at an end of the cooker in finely sliced form, and immediately enter an oil bath. The particles then encounter twin paddle wheels which break them up into discrete pieces and send them in a current downstream. The food slices then encounter a conveyor assembly which confines quantities thereof between flytes within the cooking oil and conveys the quantities the length of the cooker to a delivery conveyor at the discharge end. The delivery conveyor then removes the cooked food from the oil bath and slowly conveys it through an exit port to a hopper or sacking machine or the like. Preferably the delivery conveyor moves slowly enough so that the food particles dry as they pass through the exit port. The oil bath provided has an oil level monitor to maintain it at a predetermined level, which monitor senses the level by, for example, use of a float, and in turn actuates a pump to add oil as needed. An additional filter circuit is provided for filtering the oil in the oil bath, and a recirculating heat exchange circuit is provided to maintain the oil at a predetermined temperature.

The device of this invention also includes a unique cleaning feature for the conveyor assembly. The conveyor assembly provided within the device which transports the food to be cooked through the oil bath is a self-contained unit which normally rests on the kettle. However, by actuating a linear actuator, the entire assembly may be withdrawn from the kettle and raised out of the kettle for cleaning. When cleaning is completed the actuator process will be reversed and the assembly returned to the kettle for further cooking.

Accordingly, this invention is not intended to be limited to a specific drive means, pump, heat exchanger, or the like. The invention is intended to define a lightweight compact fryer for foods such as potato chips which will rapidly and efficiently cook the food and also may be easily cleaned and returned to service.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A continuous fryer for potato chips and other particulate foods comprising housing including an elongated kettle adapted to contain a bath of hot cooking oil and a hood, said housing having an entrance port for admitting foods to be fried and an exit port for expelling fried foods at opposite ends thereof, said kettle extending substantially the length of said housing between said ports; a conveyor assembly and drive means therefore pivotally mounted on said housing comprising paddle means disposed within said housing adjacent the entrance port for advancing foods to be fried, admitted through the entrance port, and for dispersing foods to be fried in the bath of cooking oil, delivery means disposed adjacent the exit port for removing fried foods from the oil bath and delivering the foods through the exit port, and submersion conveyor means disposed within said kettle for conveying foods to be cooked through the oil bath from said paddle means to said delivery means, said conveyor assembly means further comprising a pair of elongated, upstanding sidewalls, an endless belt rotatably mounted between said side walls and extending along the central portion thereof; and a plurality of mutually spaced flytes mounted on the external surface of said belt; said sidewalls being dimensioned to suspend said belt at a predetermined height within said kettle when said assembly is disposed therein; and pivot actuator means coupled by said housing and said assembly for simultaneously raising and lowering said paddle means, submersion conveyor means and delivery means as an assembly relative to said kettle and oil bath therein so that said assembly may be raised out of said kettle for cleaning and subsequently returned thereto for cooking by causing said assembly to pivot about said mounting on said housing, said drive means for said conveyor assembly being coupled thereto by a flexible coupling permitting pivotal movement thereof between a first position wherein said belt is horizontal and a second position wherein said belt is disposed at an acute angle to the horizontal.

2. The fryer of claim 1 wherein when said assembly is disposed in said kettle the lower surface of said belt is disposed at the surface of the oil bath when said bath is contained therein.

3. The fryer of claim 1 wherein said conveyor belt and flytes are metal mesh.

4. The fryer of claim 1 wherein said pivot actuator means comprises means for pivoting said assembly between the first and the second positions.

5. The fryer of claim 4 wherein said means for pivoting comprises a linear actuator mounted externally of said housing, a shaft rigidly mounted adjacent thereto on the external surface of one of said sidewalls and contained in a plane disposed parallel to the plane containing said belt, and connecting rod support means connecting said shaft and said actuator for pivoting said shaft and said assembly responsive to said actuator between the first and second positions of said assembly.

6. A continuous fryer for potato chips and other particulate foods comprising housing including an elongated kettle adapted to contain a bath of hot cooking oil and a hood, said housing having an entrance port for admitting foods to be fried and an exit port for expelling fried foods at opposite ends thereof, said kettle extending substantially the length of said housing between said ports; a conveyor assembly and drive means therefor pivotally mounted on a side of said housing comprising paddle means disposed within said housing adjacent the entrance port for advancing foods to be fried, admitted through the entrance port, and for dispersing foods to be fried in the bath of cooking oil, delivery means disposed adjacent the exit port for removing fried foods from the oil bath and delivering the foods through the exit port, and submersion conveyor means disposed within said kettle for conveying foods to be cooked through the oil bath from said paddle means to said delivery means; pivot actuator means coupled to said housing and said assembly for pivotal movement of said paddle means, submersion conveyor means and delivery means as an assembly relative to said kettle and oil bath therein between a position wherein said conveyor means is at least in part submerged in the oil and a position wherein said means had been pivoted out of the oil bath so that said assembly may be raised out of said kettle for cleaning and subsequently returned thereto for cooking by causing said assembly to pivot about said mounting on said housing; and heat exchange means, first pump means and first conduit means interconnecting the interior of said kettle and said first pump means and heat exchange means for recirculating cooking oil, when an oil bath is contained within said kettle, from the bath, through the heat exchanger means to heat said oil to thereby maintain said bath at a substantially constant temperature.

7. The fryer of claim 6 further comprising filter means, second pump means, and second conduit means interconnecting the interior of said kettle and said second pump means and filter means for recirculating cooking oil, when an oil bath is contained within said kettle, from the bath through the filter means to filter said oil.

8. The fryer of claim 7 further comprising oil reservoir means, third pump means, third conduit means interconnecting the interior of said kettle and said third pump means and reservoir means and oil level sensor means carried by said kettle and coupled to said third pump means for selectively actuating said third pump means to add oil to the oil bath when the bath is contained within the kettle to maintain the oil level therein substantially constant.

* * * * *